(12) United States Patent
Denkmeier et al.

(10) Patent No.: US 8,074,484 B2
(45) Date of Patent: Dec. 13, 2011

(54) MANIPULATION DEVICE AND PRODUCTION SYSTEM

(75) Inventors: Thomas Denkmeier, Traun (AT);
Bernhard Fischereder, Vöcklabruck (AT)

(73) Assignee: Trumpf Maschinen Austria GmbH & Co. KG, Pasching (AT)

( * ) Notice: Subject to any disclaimer, the term of this patent is extended or adjusted under 35 U.S.C. 154(b) by 228 days.

(21) Appl. No.: 11/876,163

(22) Filed: Oct. 22, 2007

(65) Prior Publication Data

US 2008/0226436 A1 Sep. 18, 2008

(30) Foreign Application Priority Data

Oct. 23, 2006 (AT) ................. A 1773/2006

(51) Int. Cl.
*B21J 13/10* (2006.01)
(52) U.S. Cl. ....... 72/420; 72/422; 72/405.09; 414/751.1
(58) Field of Classification Search .................. 72/420, 72/422, 428, 417–419, 405.01, 405.09, 421; 414/225.01, 758, 783, 751.1, 752.1
See application file for complete search history.

(56) References Cited

U.S. PATENT DOCUMENTS

| 4,989,444 | A | | 2/1991 | Murakami et al. | |
| 5,042,287 | A | * | 8/1991 | Sartorio | 72/422 |
| 6,722,178 | B1 | * | 4/2004 | Ito et al. | 72/420 |
| 6,938,454 | B2 | | 9/2005 | Strasser et al. | |
| 7,383,715 | B2 | | 6/2008 | Kutschker | |

FOREIGN PATENT DOCUMENTS

| JP | 60242947 A | 12/1985 |
| JP | 06262576 A | 9/1994 |
| JP | 06328140 A | 11/1994 |
| JP | 06344033 A | 12/1994 |
| JP | 07178466 A | 7/1995 |
| JP | 07214174 A | 8/1995 |
| JP | 2002200587 A | 7/2002 |
| JP | 2006123009 A | 5/2006 |
| WO | WO 03/09/5125 | 11/2003 |

* cited by examiner

*Primary Examiner* — Debra Sullivan
(74) *Attorney, Agent, or Firm* — Alston & Bird LLP

(57) ABSTRACT

The invention relates to a manipulation device (3) for manipulating a workpiece (4) on a bending press (2), comprising multiple successive moving elements (17), in particular articulated arms (18), connected to one another via articulated joints (19), wherein one moving element (22) has a rotary head (23) which is rotatable about a rotational axis (24) which at least approximately coincides with a center axis (25) of the moving element (22), and comprising a gripping device (27) connected thereto having a gripping zone (34), formed by one or more gripping elements (32), by means of which the workpiece (4) may be held. According to the invention, the gripping device (27) is connected to the rotary head (23) via a boom element (26), by means of which a midpoint (35) of the gripping zone (34) is situated at a distance (36) from the rotational axis (24), and by means of an adjustment device (40) on the boom element (26) the position and/or angular orientation of the gripping device (27) and the gripping zone (34) with respect to the boom element (26) may be adjusted in at least two different working positions.

20 Claims, 8 Drawing Sheets

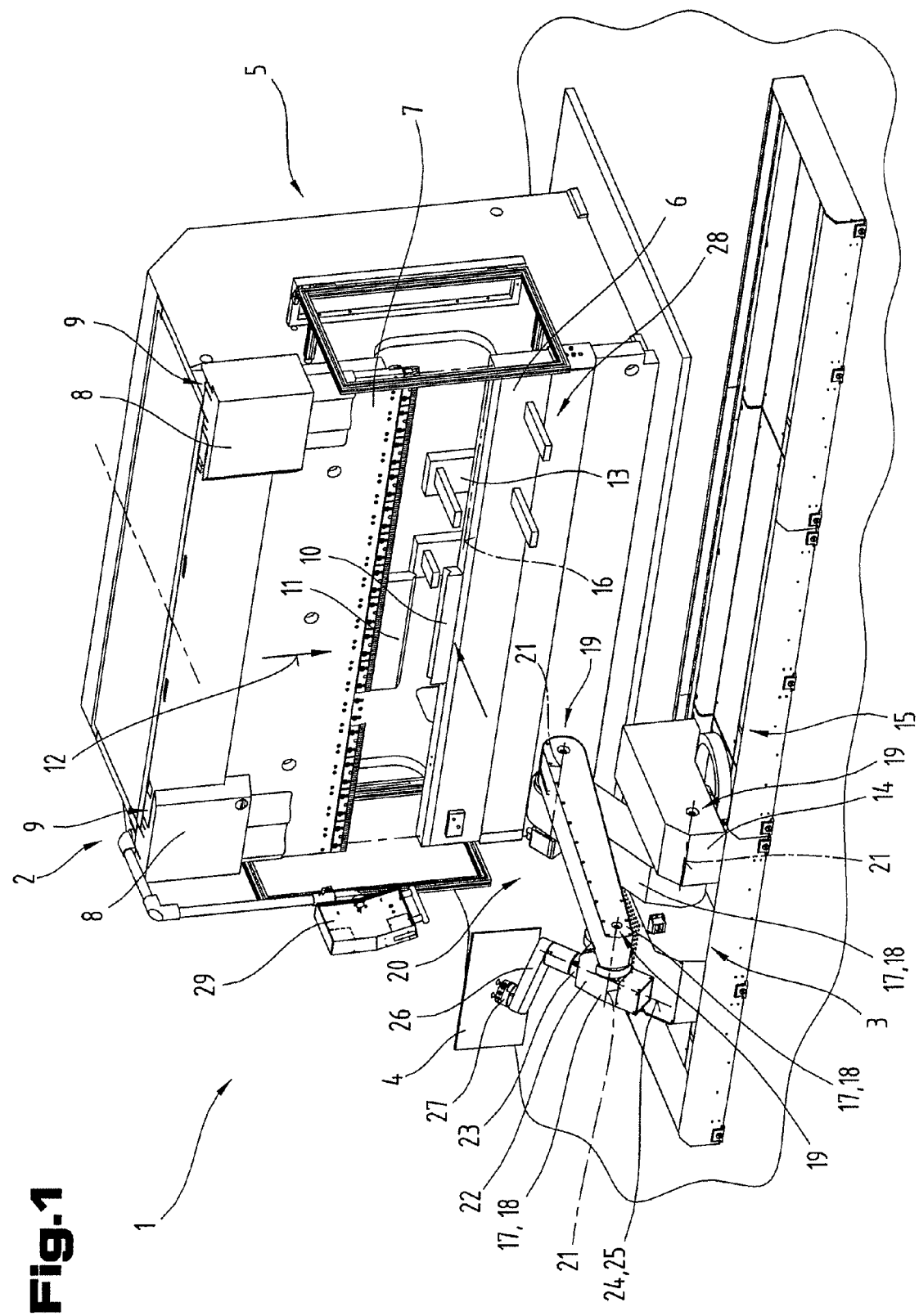

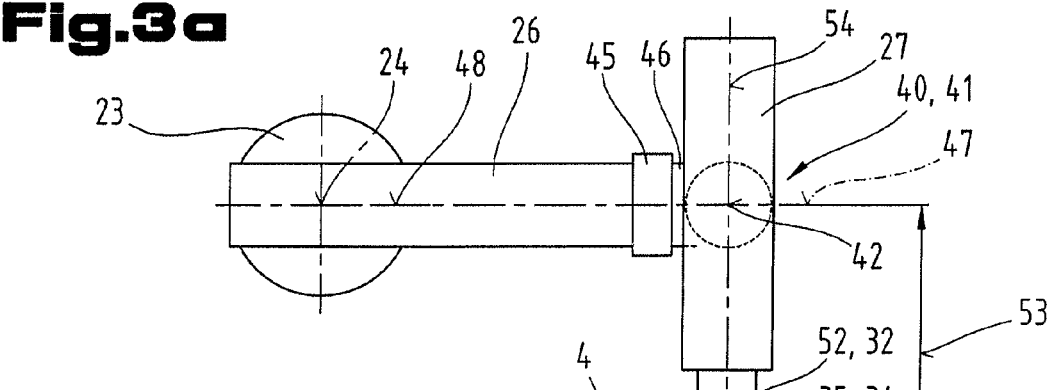
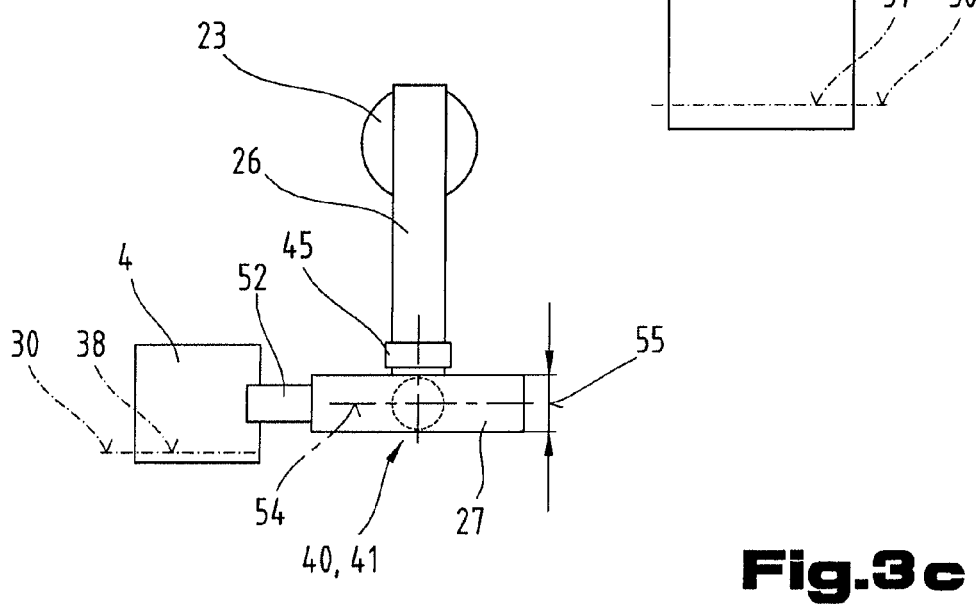
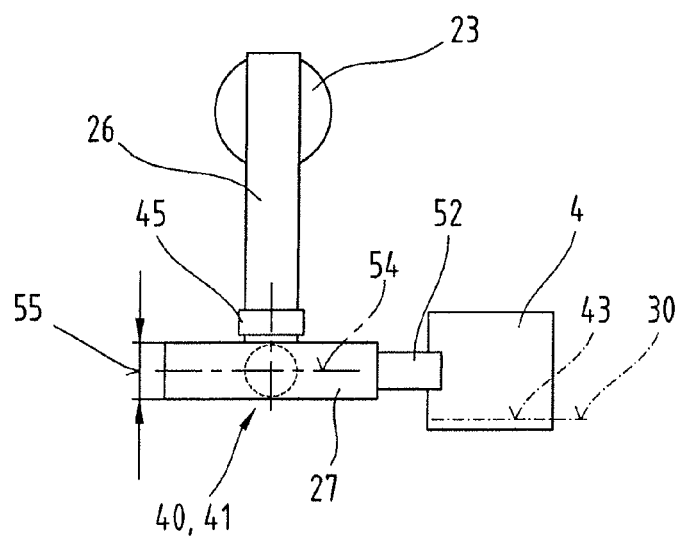

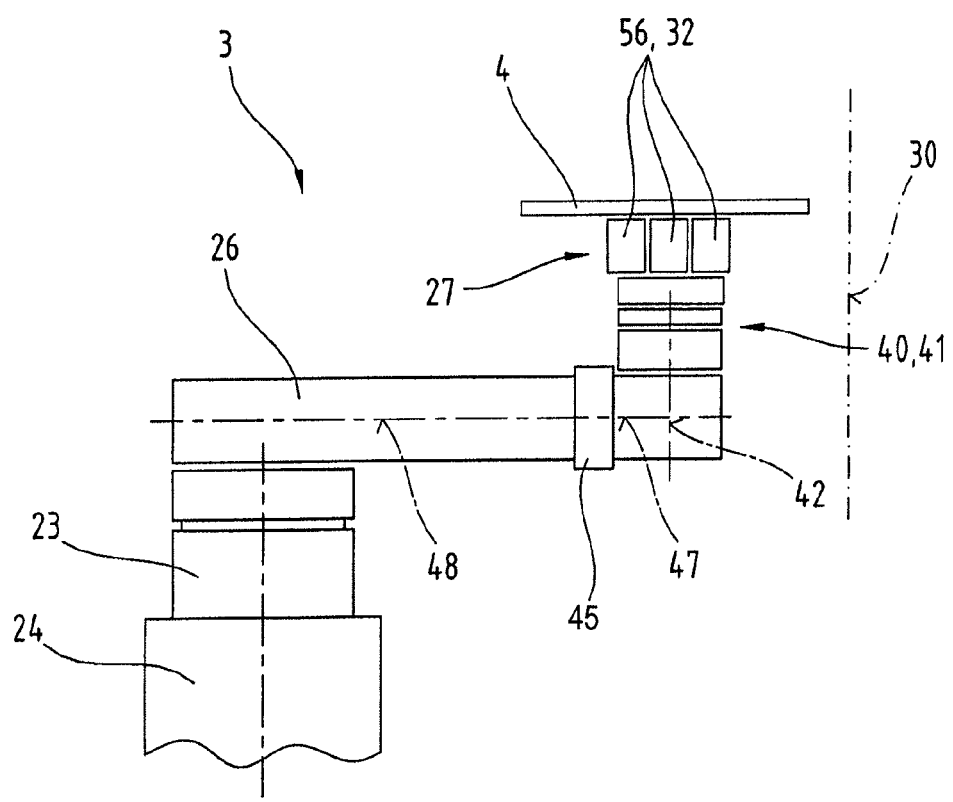

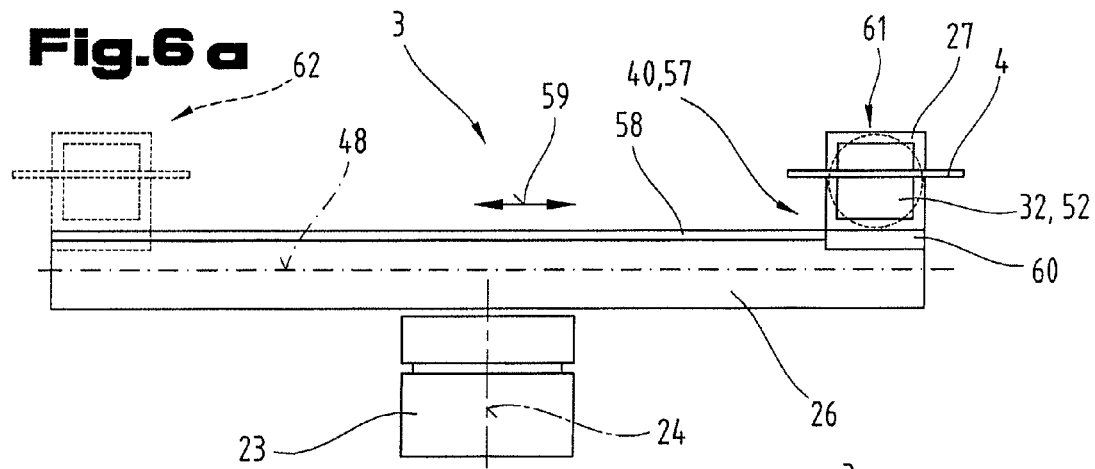
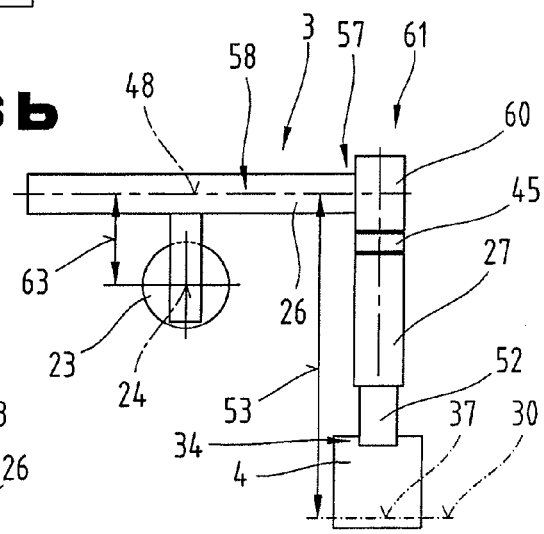
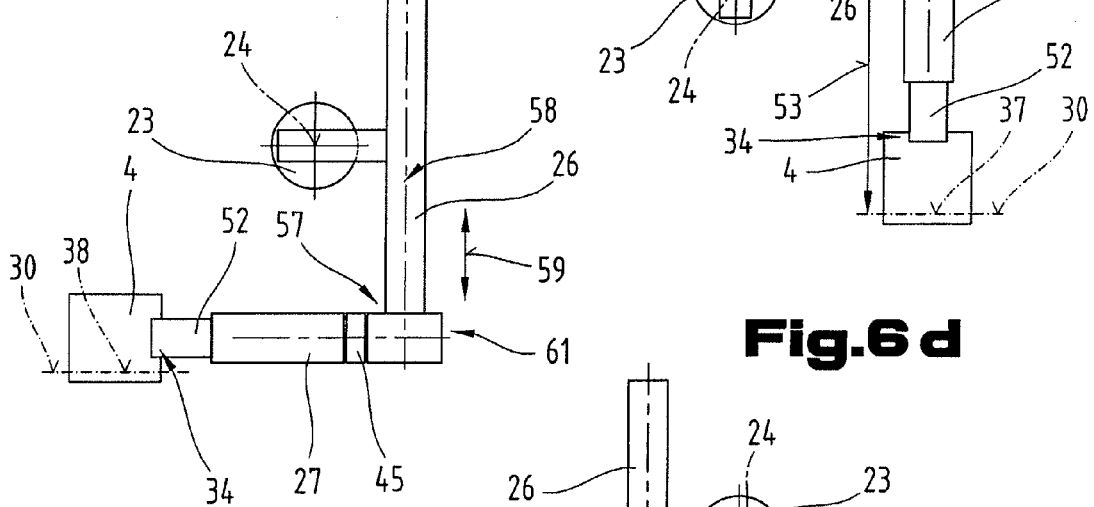
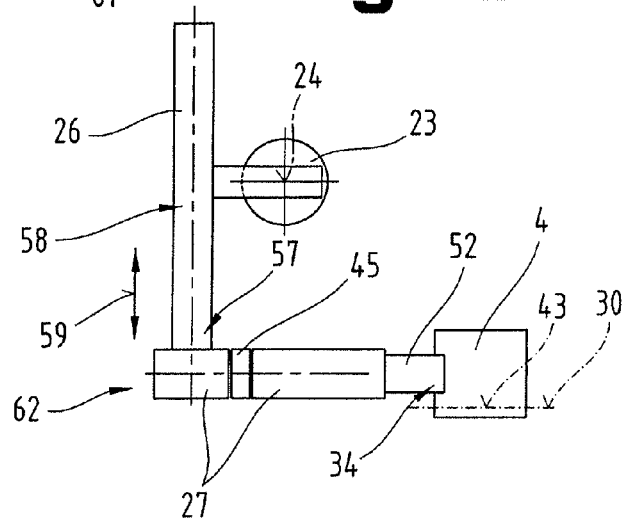

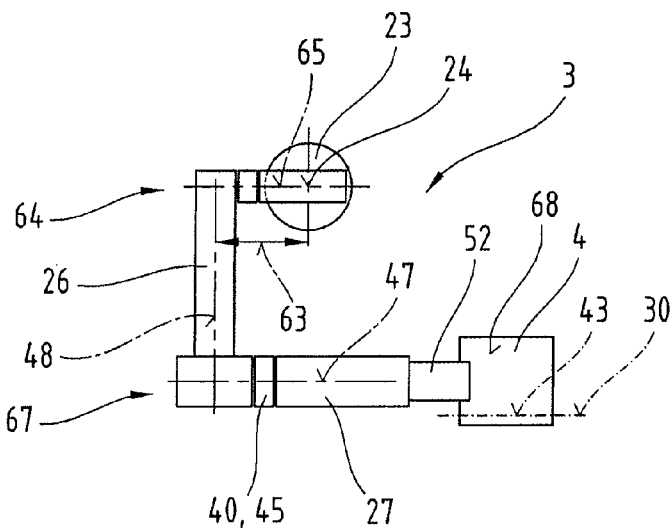

MANIPULATION DEVICE AND PRODUCTION SYSTEM

In accordance with 35 U.S.C. §119, the applicant claims priority for Austrian patent application number A 1773/2006 dated Oct. 23, 2006.

BACKGROUND OF THE INVENTION

1. Field of the Invention

The invention relates to a manipulation device for manipulating a workpiece on a bending press, comprising multiple successive moving elements in the form of articulated arms connected to one another via articulated joints, wherein one moving element has a rotary head which is rotatable about a rotational axis which at least approximately coincides with a center axis of the moving element, and comprising a gripping device connected thereto having a gripping zone, formed by one or more gripping elements, by means of which the workpiece may be held. Also described herein is a production system employing such a manipulation device.

2. Prior Art

A production system comprising a bending press, in addition to a manipulation device for positioning workpieces to be bent, is known from EP 1 503 874 B1 by the present applicant. The manipulation device is designed as a swivel-arm system, and at one end region of the swivel-arm system has a rotary device with a rotational axis perpendicular to the swivel axes of the swivel-arm system. A gripping device is provided on this rotary device for grasping workpieces to be bent on the bending press. In particular for small workpieces to which bending edges are to be applied in various directions, for a manipulation device having such a design it is necessary for the gripping device to grasp the workpiece at various gripping positions between the individual bending operations, since collisions with the bending press would otherwise be unavoidable as a result of the geometries of the swivel-arm system and the rotary device. Naturally, these regripping procedures are at the expense of productive machining time, and increase the manufacturing costs for such workpieces due to the longer time that the machines are occupied. Since for each regripping procedure there is also the risk of positioning errors, the overall workpiece precision may suffer, which may likewise adversely affect the economical use of such a manipulation device as the result of possible rejects, refinishing, or complaints.

OBJECTS AND ADVANTAGES OF THE INVENTION

Proceeding from this prior art, the object of the invention is to improve the known manipulation device for use with a bending press, and thereby expand the automatic positioning of workpieces in a production system using a bending press to a broader workpiece spectrum, and improve the performance of such a production system.

This object of the invention is achieved by connecting the gripping device to the rotary head via a boom element, by means of which a midpoint of the gripping zone is situated at a distance from the rotational axis, and by means of an adjustment device on the boom element the position and/or angular orientation of the gripping device and the gripping zone with respect to the boom element may be adjusted in at least two different working positions.

The major advantage of combining a boom element, which brings the workpiece to a distance from the interference contour produced by the rotary head in the known manipulation device, and an adjustment device which is able to change the position and/or angular orientation of the workpiece relative to the boom element, is that, firstly, in this manner bending edges oriented in various directions may be positioned on smaller workpieces up to the bending plane, thereby expanding the overall spectrum of machinable workpieces. Secondly, the machining time for workpieces with multiple bending edges, in particular those extending in nonparallel directions, is greatly reduced, since in many cases time-consuming regripping procedures may be omitted. The improved capability for machining small workpieces at multiple bending edges becomes more flexible the smaller the interference contour of the boom element together with the gripping device. Furthermore, the economically feasible scope of application of a bending press automated by use of a manipulation device is expanded by these additional machining capabilities. The adjustment device includes an adjustment drive which applies the forces or torques necessary for the adjustment motion.

In one embodiment of the manipulation device, a longitudinal axis of the boom element intersects the rotational axis, so that the gripping device is essentially radially displaced with respect to the rotational axis. For gripping elements which hold a workpiece at only one surface, such as vacuum suction elements or magnetic gripping elements, the gripping zone and the midpoint thereof may be positioned approximately in the plane defined by the rotational axis and the boom longitudinal axis, thus simplifying calculation of the gripping position.

Alternatively, a longitudinal axis of the boom element may be situated at a boom distance from the rotational axis. Such a distance may be utilized to minimize a load torque exerted on the rotary head by the gripping device and a held workpiece as the result of being able to position their centers of gravity in a plane extending through the rotational axis. In addition, the position of the gripping device may thus be adapted to the adjustment capabilities of the particular adjustment device used.

An uncomplicated calculation of the workpiece position and a simple design of the connections between the rotary head and boom element or between the boom element and gripping device may be achieved when the boom longitudinal axis in its working position is oriented in a plane perpendicular to the rotational axis.

Besides the advantage described above, it may be advantageous, in particular for vacuum gripping devices or magnetic gripping devices having a central application of force in the gripping zone, for the center of the gripping zone to coincide at least approximately with the boom longitudinal axis, thereby minimizing load torques on the rotary head.

An angled configuration of the boom element and gripping device, with the resulting additional capabilities for machining differently oriented bending edges without regripping, is achieved when a primary axis of the gripping device can be oriented transverse to the boom longitudinal axis, so that in this position the center of the gripping zone is situated at a gripping distance from the boom longitudinal axis. In this manner a workpiece, together with the distance resulting from the length of the boom element, is at a sufficient distance from the interference contour of the rotary head in two positions of the rotary head produced by a 90° rotation.

When a width of the gripping device, measured transverse to a gripping device primary axis, is smaller than and in particular less than half the cross-sectional dimension of the moving element having the rotary head, a sufficient overlap with the gripping device, even for a workpiece having a small width, may be achieved in order to also perform bending operations with the gripping device primary axis parallel to the bending plane.

In one advantageous embodiment of the manipulation device or the production system, the adjustment device is formed by an auxiliary rotary device on the boom element for rotation of the gripping device about an auxiliary rotational axis which is essentially parallel to the rotational axis. In this manner the workpiece may be brought into two or more different positions without moving the rotary head or the boom element.

When by use of the auxiliary rotary device the gripping device is designed to be rotatable by one or more angular increments of 90° each, starting from a reference position, the design of the auxiliary rotary device may be kept simple, since these angular increments may be carried out with high accuracy using switchable end stops, for example.

In contrast, additional machining capabilities may be provided by the fact that, by use of the auxiliary rotary device, the gripping device is essentially infinitely rotationally adjustable, starting from a reference position. Thus, for example, bending edges which assume any given angle with respect to one another may be machined without adjusting the rotary head.

As an alternative or also in addition to an auxiliary rotary device, the adjustment device on the boom element may include a linear drive for moving the gripping device along a linear guide on the boom element. By use of such a linear drive, which may have a simple design, the position or angular orientation of a workpiece relative to the boom element may likewise be easily changed in order to economize on regripping procedures.

When the linear guide and thus also the displacement direction of the gripping device lies in a plane perpendicular to the rotational axis, in a simple design the linear guide may be situated on the boom element parallel to the boom longitudinal axis.

A simpler calculation of the position may be performed when the gripping device, by use of the linear drive, may be moved into two working positions on the boom element which are essentially mirror-symmetrical with respect to the rotational axis. A simple design approach using mirror-symmetrical end stops, for example, is sufficient for this purpose.

The linear drive may advantageously include a pneumatically or electrically drivable linear motor, which may be equipped with or without displacement control, and due to a large selection of complete systems an optimal coverage of the most important applications is easily provided.

The boom element may be supported so as to be rotatable about its boom longitudinal axis relative to the rotary head, this rotation about its own axis providing an additional adjustment possibility for the workpiece position which may be used, for example, for negative edging, i.e., bending in various directions relative to a reference surface on the workpiece.

Furthermore, the longitudinal axis of the boom element may be provided so as to be movable relative to the rotary head; i.e., the boom element assumes not only the various rotational angles as described above, but also assumes various directional angles relative to the rotary head.

In contrast to the latter two embodiments, a simpler design for attaching the boom element to the rotary head is possible when a longitudinal axis of the boom element is rigid with respect to the rotary head.

Thus, the boom element may in particular be supported on the rotary head so as to be pivotable about a swivel rotational axis which intersects the rotational axis, in particular at right angles, and is in mechanical linkage with a swivel rotation device. In this embodiment the adjustment device may include, for example, a reversing rotation device for a rotational motion of the gripping device about a reversing axis that is parallel to a gripping device primary axis; i.e., the gripping device is able to rotate about its own primary axis, as the result of which a workpiece may be positioned in a very flexible manner.

In all the embodiments of the manipulation device, the gripping device may advantageously be pivotably supported relative to the boom element by use of a reversing rotation device, about a reversing axis that is parallel to or coincident with a gripping device primary axis, thus allowing, among other procedures, negative edging as previously described to be easily performed.

A similar effect may be achieved when the gripping device is pivotably supported on the boom element by means of a reversing rotation device, about a reversing axis that is parallel to or coincident with the boom longitudinal axis. The choice between this variant and the variant just described may be made based on design considerations, with a combination of the two also being possible.

Simple design approaches of sufficient flexibility may nevertheless be selected in many cases when, by use of the reversing rotation device, the gripping device may be rotated by angular increments of 180° each, starting from a reference angular orientation. This is possible using switchable stops, similarly as for the auxiliary rotary device, for example.

The gripping device may advantageously include one or more gripping elements in the form of a magnetic gripping element, a tong gripping element, and/or a vacuum suction element, wherein the choice may be made depending on the product spectrum to be machined, in particular the workpiece geometry.

Brief retooling procedures on the manipulation device may be performed when the boom element is connected to the rotary head via a coupling mechanism. This relates to a mechanical, electrical, or control coupling. At the other articulated joints between the individual moving elements of the manipulation device. these couplings may be made using, for example, flexible lines or also slide contacts, whereby with the latter there are fewer limitations in programming of the motion control.

In one flexible embodiment of the production system, the manipulation device is supported on a guide system so as to be displaceable in the direction of a longitudinal axis of the press crosshead, in particular when the guide system is situated not on the bending press, but instead on a production room floor, for example. The bending press may thus be operated over its entire length, and the working space for the manipulation device may even extend laterally beyond same. In this manner an existing bending press may be easily retrofitted with a manipulator without the need for more extensive structural changes. The control of the bending press must be linked to the control of the manipulation device.

In one embodiment which is mechanically stable and provided with the greatest possible working space, the manipulation device, starting from a base frame, comprises three moving elements designed as swivel arms which via swivel joints are connected to form a swivel-arm system, with their swivel joints oriented parallel to the longitudinal axis of the press crossheads and with the rotary head mounted on the third swivel arm.

BRIEF DESCRIPTION OF THE FIGURES

To aid in understanding of the invention, the invention is explained in greater detail with reference to the exemplary embodiments illustrated in the figures.

The figures show the following in simplified, schematic illustrations:

FIG. 1: shows a production system according to the invention, with a bending press and a manipulation device;

FIGS. 3a through 3c: show a top view of the portion of a manipulation device according to the invention connected to the rotary head, in a further embodiment with a tong gripping device;

FIG. 4: shows a view of a portion of a manipulation device according to the invention, in a further exemplary embodiment with a magnet gripping device;

FIGS. 6a through 6d: show a further exemplary embodiment of a manipulation device according to the invention, with an adjustment device in the form of a linear drive;

FIGS. 7a through 7d: show a side view and three top views of a manipulation device according to the invention, with a foldable boom element.

DETAILED DESCRIPTION OF THE PREFERRED EMBODIMENTS

Figure 2A:
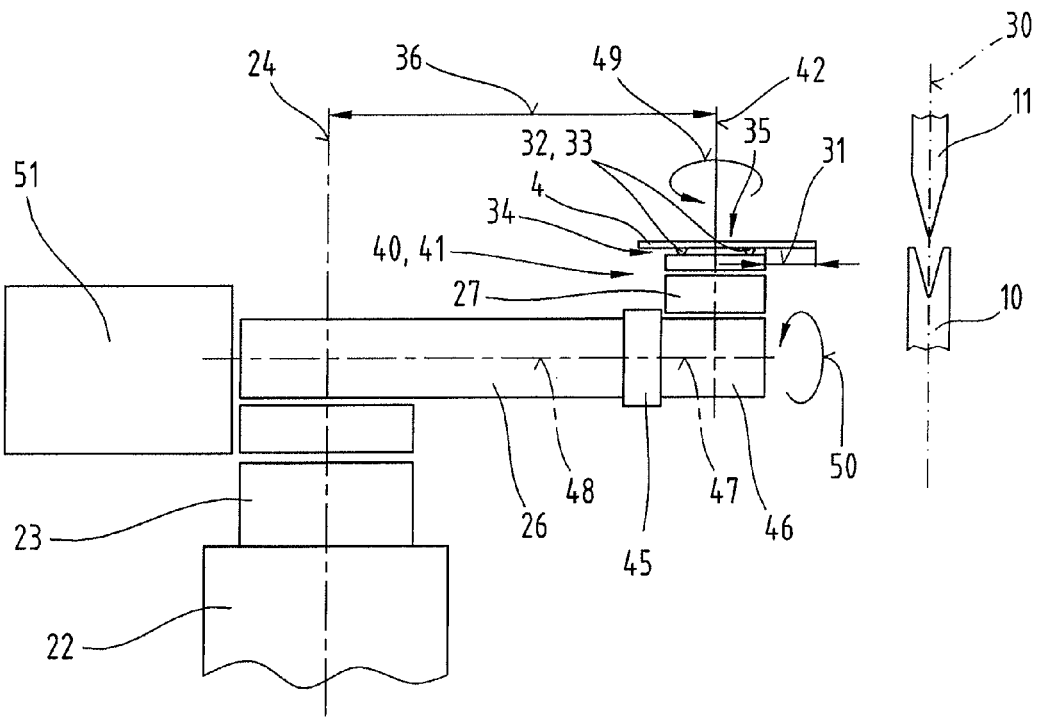
FIGS. 2a and 2b: respectively show a side view and a top view of a rotary head of a manipulation device according to the invention, in the direction of the rotational axis of the rotary head, in a first exemplary embodiment with a vacuum gripping device.

At the outset it is noted that in the various described embodiments, the same parts are provided with identical reference numerals or identical component names, whereby the disclosures contained in the overall description may be correspondingly transferred to the same parts with identical reference numerals or identical component names. In addition, positional information used in the description, such as above, below, to the side, etc., refers to the figure which has just been described or represented, and for a change in position is to be correspondingly transferred to the new position. Furthermore, individual features or feature combinations from the various illustrated and described exemplary embodiments may separately represent independent inventive approaches.

All statements concerning value ranges in the description of the subject matter are to be construed such that said ranges include any and all partial ranges thereof; for example, the statement "1 through 10" is understood to mean that all partial ranges, starting from the lower limit of 1, include the upper limit of 10; i.e., all partial ranges begin with a lower limit of 1 or greater and end at an upper limit of 10 or less, for example, 1 through 1.7, or 3.2 through 8.1, or 5.5 through 10.

FIG. 1 shows a production system 1 comprising a bending press 2 and a manipulation device 3 according to the invention for bend-shaping plates made of deformable materials, in particular sheet metal, hereinafter referred to simply as workpiece 4. The workpieces 4 which may be machined by using the production system 1 essentially correspond to those which are machinable by operators on a stand-alone bending press 2, wherein solely by use of the manipulation device 3 the spectrum of workpieces 4 which may be machined by using the production system 1 may be limited by manipulability and automatic gripping.

Details of the bending press 2 are not addressed here, since such are already known from the prior art. The bending press 2 essentially comprises a machine frame 5 having a stationary lower press crosshead 6 and an upper press crosshead 7 aligned therewith in the same plane. The upper press crosshead is supported on the machine frame 5 by means of an actuator 8 and a guide system 9 so as to be displaceable in the direction of the stationary press crosshead 6. In addition, the press crossheads 6, 7 are mutually aligned essentially horizontally and in parallel. A bending punch is affixed to the lower press crosshead 6 as a lower bending tool 10, and a bending die is affixed to the upper adjustable press crosshead 7 as a bending tool 11, and the bending tools cooperate to produce a bending edge when the adjustable press crosshead 7 is lowered against a workpiece 4 in the pressing direction 12. The bending process used may be a free bending process, a free point bending process, or a stamping-bending process, wherein a corresponding bending tool 10, 11 is used, depending on the particular bending process employed.

The sheet metal workpiece 4 to be bent is positioned for the production system 1 not by an operator, but instead by the manipulation device 3, between the bending tools 10, 11, and is optionally aligned precisely with respect to the bending line on one or more backstops 13, continuously held during the bending process, and corrected, and following the bending process is removed from the bending press and prepared for a subsequent bending process or stored for further machining. When backstops 13 are used for precise positioning, the accuracy to be maintained by the manipulation device 3 and its components with regard to positioning and angular orientation may be set to a somewhat lower level, thereby keeping the capital costs relatively low.

The manipulation device 3 comprises a base frame 14, which in the illustrated exemplary embodiment is supported so as to be displaceable along a guide system 15 in the direction of a longitudinal axis 16 of the bending press 1, thus allowing the manipulation device 3 to assume various positions along the longitudinal axis 16. Provided in succession on the base frame 14 are multiple moving elements 17, which in the illustrated exemplary embodiment are three swivel arms 18, which are connected to the base frame 14 or to one another via swivel joints 19 to form a swivel-arm system 20. The swivel joints 19 have mutually parallel swivel axes 21 oriented in parallel to the guide system 15 and thus also to the longitudinal axis 16 of the press crossheads 6, 7. Mounted on a last moving element 22 of the swivel-arm system 20 is a rotary head 23 which is able to rotate relative to the last moving element 22, wherein a rotational axis 24 of this rotational motion essentially coincides with a center axis 25 of the moving element. On the rotary head 23 is provided a boom element 26, which at its end bears a gripping device 27 for grasping the workpiece 4, and which in the illustrated exemplary embodiment is oriented perpendicular to the rotational axis 25. By use of the manipulation device 3, a workpiece 4 grasped by the gripping device 27 may thus be modified in its position and orientation with respect to the bending press 2, in particular the lower bending tool 10, in any given manner, thus allowing various bending tasks to be performed. Depending on the dimensions and the geometry of the workpiece 4, it may be necessary for the gripping device 27 to change the gripping position on the workpiece 4, for which purpose a regripping station 28 is provided, for example in the region of the lower press crosshead 6, and the regripping station is able to hold the workpiece 4 during the regripping procedure and precisely fix same in place.

FIG. 1 also shows a control and monitoring device 29 by means of which the functions of the production system 1 are controlled and monitored.

The following figures illustrate various embodiments of the boom element 26 connected to the rotary head 23, as well as the gripping device 27 connected thereto, which are explained below.

FIG. 2a schematically shows the portion of the manipulation device 3 connected to the moving element 22, by means of which a workpiece 4 may be positioned between the bending tools 10, 11. When a bending operation is performed, in particular a folding operation on a bending press 2, a workpiece 4 must extend through a bending plane defined by the lower bending tool 10 and the upper bending tool 11; i.e., the workpiece 4 requires an overlap 31 by which it freely projects beyond the gripping device 27 or the manipulation device 3. The manipulation device 3 thus forms a so-called interference contour for performing bending operations, and is able to hinder the necessary positioning processes for the workpiece 4 with respect to the bending tools 10, 11 as well as the press crossheads 6, 7 bearing same. In particular when multiple edgings are to be performed on a workpiece 4, the interference contour for the manipulation device 3 in each case makes it necessary to carry out a regripping procedure between the individual bending operations, and to perform regripping the workpiece 4 must be positioned in the regripping station 28 and grasped at another gripping position. Such regripping procedures increase the cycle time and thus the time that the machine is occupied, for which reason efforts are made to perform the edgings on a workpiece 4 using the fewest possible regripping procedures.

In the illustrated exemplary embodiment the gripping device 27 comprises multiple gripping elements 32 designed as vacuum suction elements 33. The gripping elements 32 or vacuum suction elements 33 define a gripping zone 34 on the gripping device 27 by means of which a workpiece 4 may be held. Depending on the type of gripping elements 32, and their size and configuration on the gripping device 27, the gripping zone 34 may have a greater planar extension, or in the case of a tong gripper, for example, may be very small. According to the invention, a midpoint 35 of the gripping zone 34 is situated at a distance 36 from the rotational axis 24 of the rotary head 23. In other words, the gripping device 27 grasps the workpiece 4 eccentrically with respect to the rotational axis 24. This distance 36 is provided by the above-mentioned boom element 26, which also brings the gripping device 27 to a distance from the rotational axis 24.

Figure 2B:
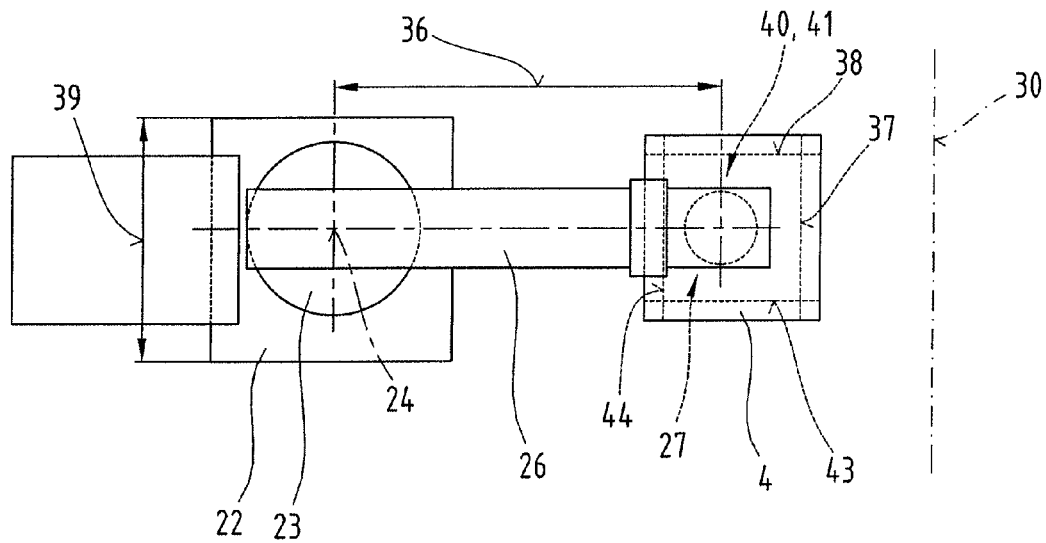

As shown clearly in FIG. 2b, a first bending edge 37 for the workpiece 4 may easily be brought into congruence with the bending plane 30, since the workpiece 4 has a sufficient overlap 31 with respect to the interference contour. A second bending edge 38, perpendicular to the first bending edge 37 on the workpiece 4, likewise has an overlap with respect to the gripping device 27 or the boom element 26, but a cross-sectional dimension 39 of the moving element 22 is large enough that the workpiece 4 cannot be brought into congruence with the bending plane 30 simply by rotating the boom element 26 by 90° through the rotational axis 24 and moving the swivel-arm system 20. To allow the workpiece 4 to be machined on the second bending edge 38, the workpiece must either be deposited at the regripping station 28 so that the gripping device 27 can assume another gripping position on the workpiece 4, or the workpiece 4 must be changed in its position and/or its angular orientation relative to the boom element 26. For this purpose the manipulation device 3 according to the invention has an adjustment device 40 by means of which the position and/or the angular orientation of the gripping device 27, and thus of the workpiece 4 grasped thereby, may be changed relative to the boom element 26.

In the illustrated exemplary embodiment, this adjustment device 40 is formed by an auxiliary rotary device 41 by means of which the gripping device 27 is supported so as to be rotatable, about an auxiliary rotational axis 42, relative to the boom element 26. This auxiliary rotational axis 42 is essentially parallel to the rotational axis 24, and allows the angular orientation of the gripping device 27, and thus of the workpiece 4, relative to the boom element 26 to be adjusted, wherein the adjustment may be performed in fairly large angular increments, in particular 90° increments, but may also be performed essentially in an infinitely variable manner. The positioning of the workpiece 4 for carrying out the bending on the second bending edge 38 is primarily performed not by a motion of the swivel-arm system 20 or of the rotary head 23, but instead mainly by a rotation of the gripping device 27 about the auxiliary rotational axis 42, or, for the workpiece 4 illustrated, a rotation about an angle of 90°. Thus, by use of the adjustment device 40 in the form of the auxiliary rotary device 41, the gripping device 27 and the gripping zone 34 may assume at least two different positions with respect to the boom element 26, thus allowing the workpiece 4 to be bent at two bending edges 37, 38 without a regripping procedure, even when the applicable dimensions of the workpiece 4 are smaller than the relevant cross-sectional dimensions of the manipulation device 3. By use of the auxiliary rotary device 41, for example a third bending edge 43 and a fourth bending edge 44 may be machined on the workpiece 4 without the need for a regripping procedure. In the present case this is possible because the gripping device 27 grasps the workpiece 4 in such a way that all four edges are free and are able to project with respect to the gripping device 27.

To allow production of edgings in the opposite direction, i.e., counterbends, on the workpiece 4, a reversing rotation device 45 is also provided on the boom element 26 by means of which an end section 46 of the boom element 26, and thus also the gripping device 27 together with a workpiece 4 which may be grasped, is movable about a reversing axis 47 which essentially coincides with a boom longitudinal axis 48. The auxiliary rotational direction 49 and the reversing rotational direction 50 are indicated in FIG. 2 by corresponding arrows to illustrate the additional turning directions. The adjustment drive necessary for the auxiliary rotation device 41 and for the reversing rotation device 45 is simplified by use of a drive motor 51. In the exemplary embodiment according to FIGS. 2a and 2b, the boom longitudinal axis 48 intersects the rotational axis 24 at a right angle, although in a departure therefrom, modifications of the shape are possible in which the boom longitudinal axis 48 intersects the rotational axis 24 at an angle that is different from a right angle, or does not intersect same but instead is situated at a distance from the rotational axis 24.

In FIGS. 3a through 7d the drive motor 51 for the adjustment drive of the adjustment device 40 is not illustrated for the sake of simplicity.

FIG. 3a schematically shows a view of a further embodiment of the manipulation device 3 according to the invention, viewed in the direction of the rotational axis 24 of the rotary head 23. Once again a boom element 26 is provided on the rotary head, and the boom longitudinal axis 48 once again intersects the rotational axis 24 at a right angle. The end section 46 of the boom element 26 is once again supported by a reversing rotation device 45 so as to be rotatable about the boom longitudinal axis 48, and bears the gripping device 27. In the exemplary embodiment according to FIGS. 3a through 3c, the gripping device is provided with a tong gripping element 52 which by an edge grasps the workpiece 4 to be machined. In this case the gripping zone 34 is defined by the contact surface between the tong gripping element 52 and the workpiece 4. The tong gripping element 52 comprises at least two cooperating tong elements which grasp a workpiece 4 at two opposite surfaces. A stationary tong element may be provided, thereby simplifying the calculation of the workpiece surface contacted by the tong element. The dimensions of the gripping device 27, in particular a tong gripping element 52, should be as thin as possible in terms of the smallest possible interference contour, whereby greatly differing workpiece dimensions and weights may require a number of tong gripping elements 52 having different designs.

Between the end section 46 and the gripping device 27 an auxiliary rotary device 41 is once again provided as an adjustment device 40, by means of which the gripping device 27 can be rotated about the auxiliary rotational axis 42 parallel to the rotational axis 24. In this manner the gripping device 27 and the gripping zone 34 may be moved in various positions and angular orientations relative to the boom element 26. In contrast to the design according to FIGS. 2a and 2b, in the present embodiment the gripping zone 35 does not coincide with the boom longitudinal axis 48 or the auxiliary rotational axis 42, but in the illustrated positions is instead situated at a gripping distance 53 by which at the gripping zone 34 the workpiece 4 is grasped eccentrically with respect to the auxiliary rotational axis 42 or the boom longitudinal axis 48. The gripping device 27 has a gripping device primary axis 54, which in the illustrated situations extends transversely at right angles to the boom longitudinal axis 48. In the view illustrated, the total distance of the gripping zone 34 from the rotational axis 24 is thus the sum of the axial distance between the rotational axis 24 and the auxiliary rotational axis 42 plus the gripping distance 53 perpendicular thereto. By means of the gripping distance 53, which in the present case is positive, the adjustment device 40 in the form of the auxiliary rotary device 41 adjusts not only the angular orientation of the gripping zone 34, but also the position thereof relative to the boom element 26.

In the illustrated first working position, the first bending edge 37 is positioned in the bending plane 30, after which the first edging may be performed on the workpiece 4.

To position the second bending edge 38 in the bending plane 30, as illustrated in FIG. 3b, the boom element 26 together with the rotary head 23 is rotated clockwise 90° about the rotational axis 24. Any additional motions of the manipulation device 3 required to bring the workpiece 4 to the appropriate position between the bending tools 10, 11, in particular a motion of the base frame 14 in the direction of the longitudinal axis 16, are disregarded in this consideration. To subsequently position the third bending edge 43 in the bending plane 30, the auxiliary rotary device 41 is activated, thereby bringing the gripping device 27 into the position illustrated in FIG. 3c. As shown in FIGS. 3b and 3c, the ability of the gripping device primary axis 54 to approach the bending plane 30 is limited by a width 55 of the gripping device 27, measured transverse to the gripping device primary axis 54. By means of the three positions of the manipulation device 3 according to FIGS. 3a through 3c, three edgings may thus be performed on a workpiece 4 without the need for a regripping procedure. If edging is also to be performed on the edge grasped by the tong gripping element 52, a regripping procedure is absolutely necessary, which for the design of the manipulation device known from the prior art is already required after the first edging.

To allow counterbends, i.e., negative edgings, to be carried out, a reversing rotation device 45 is mounted on the boom element 26 as in the design according to FIGS. 2a and 2b, by means of which the gripping device 27 may be rotated about the reversing axis 47.

FIG. 4 shows a further exemplary embodiment of the manipulation device 3 according to the invention, which, except for the type of gripping device 27 and the drive motor 48, not illustrated for the sake of simplicity, corresponds to the design according to FIG. 2a. In this exemplary embodiment the gripping device 27 is provided with magnetic gripping elements 56 for grasping a workpiece 4 to be machined, and which, similar to the design using vacuum suction elements 33, grasp the workpiece 4 at a surface, thus allowing the edges of the workpiece to project freely with respect to the gripping device 27 for bending on all sides. To allow the magnetic holding force acting on a sheet metal piece 4 to be discontinued in order to release the workpiece 4, a magnetic gripping element 56 includes switchable permanent magnets, for example, but preferably switchable electromagnets. In other respects the design and use correspond to the embodiment according to FIGS. 2a and 2b when the gripping zone 34 is located in the extension of the boom longitudinal axis 48.

Figure 5A:
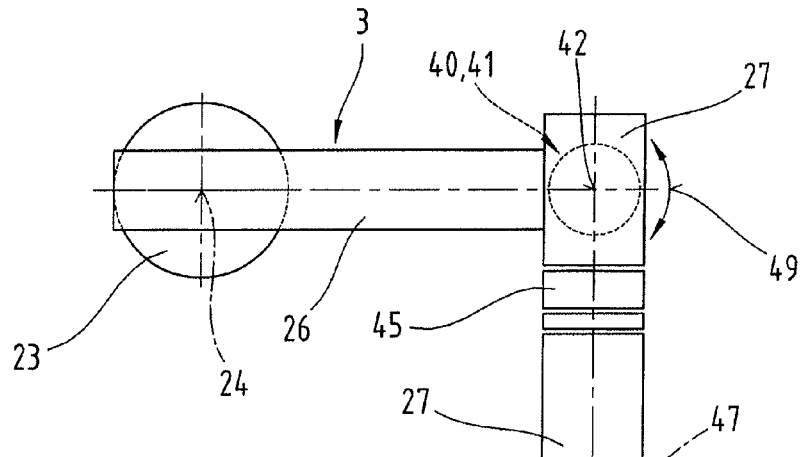
FIGS. 5a through 5c: show a top view of portion of a manipulation device according to the invention, in a further exemplary embodiment with a modified orientation of the reversing axis.
Figure 5B:
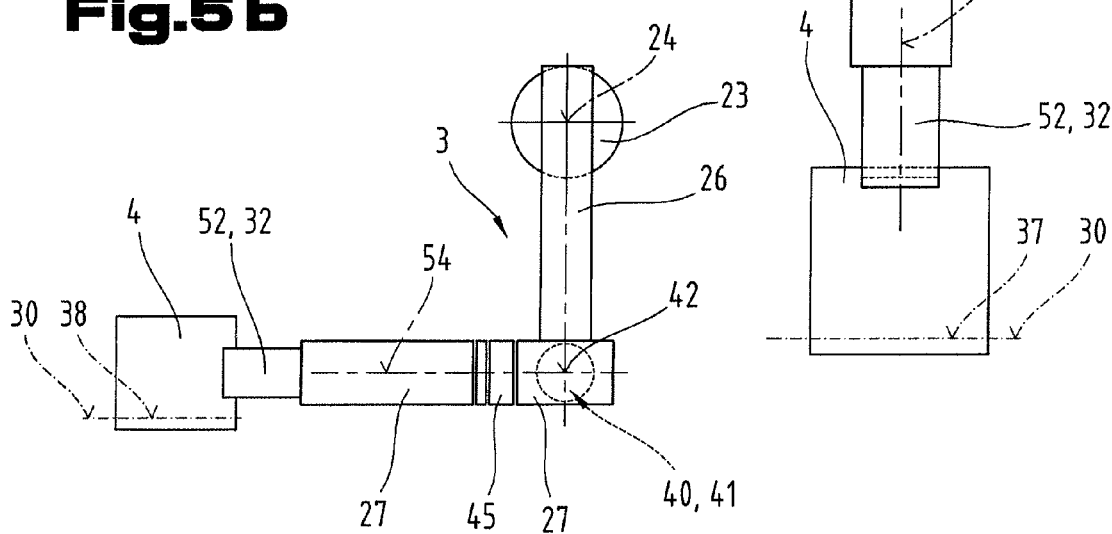
Figure 5C:
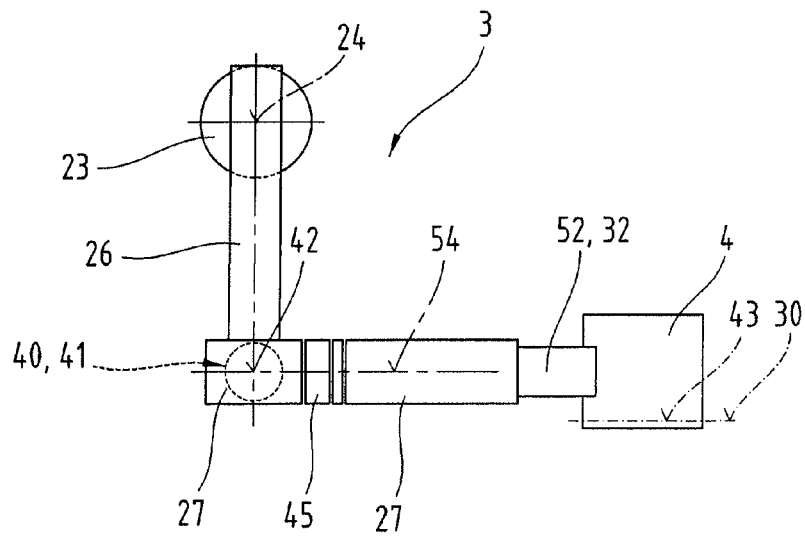

FIGS. 5a through 5c illustrate a further embodiment of the manipulation device 3 according to the invention in three different positions, viewed in the direction of the rotational axis 24 of the rotary head 23.

FIG. 5a once again shows a rotary head 23 which is mounted on the swivel-arm system 20 (not illustrated) and to which the boom element 26 is attached. At the end of the boom element the gripping device 27, with the assistance of the adjustment device 40 in the form of an auxiliary rotary device 41, is once again supported so as to be rotatable about the auxiliary rotational axis 42 parallel to the rotational axis 24. In contrast to the design according to FIG. 3a, the reversing rotation device 45 is mounted on the gripping device 27, not on the boom element 26. In this exemplary embodiment the workpiece 4 is held by a gripping element 32 in the form of a tong gripping element 52. FIG. 5a shows the positioning of the first bending edge 37 in the bending plane 30.

As a result of this configuration of the reversing rotation device 45, the reversing axis 47 is oriented in parallel to the gripping device primary axis 54 or coincident with same.

FIGS. 5b and 5c show the same embodiment of the manipulation device 3, in the positions for machining the second bending edge 38 and the third bending edge 43, respectively, on the workpiece 4. The position in FIG. 5b follows from the position according to FIG. 5a, with the boom element 26 moved clockwise by 90° by activation of the rotary head 23; the position in FIG. 5c follows from the position in FIG. 5b, in which the adjustment device 40 in the form of an auxiliary rotary device 41 moves the gripping device 27 by 180° through the auxiliary rotational axis 42 relative to the boom element 26.

FIGS. 6a through 6d show a further embodiment of the manipulation device 3 according to the invention, wherein only the portion connected to the rotary head 23 is illustrated.

FIG. 6a shows a view transverse to the rotational axis 24 of the rotary head 23 in a simplified schematic illustration. A boom element 26 is once again fastened to the rotary head 23, and once again fastened to the boom element is the gripping device 27, which in this exemplary embodiment is once again in the form of a tong gripper having gripping elements 32 in the form of tong gripping elements 52 which are able to grasp a workpiece 4. In this embodiment the adjustment device 40 for moving the gripping device 27 relative to the boom element 26 includes a linear drive 57 which allows linear displacement of the gripping device 27 relative to the boom element 26. A linear guide 58 on the boom element 26 defines a displacement direction 59 for the motion of the gripping device 27. In this embodiment the linear drive 57 includes a guide runner 60 which is supported so as to be displaceable on the linear guide 58. The gripping device 27 may thus be moved from a first working position 61, illustrated by solid lines, into a second working position 62, illustrated by dashed lines. As shown in FIG. 6a, these two working positions 61, 62 are preferably mirror-symmetrical with respect to the rotational axis 24, and with the assistance of a linear motor (not illustrated), which may be driven by electrical or pneumatic means, for example, may be arrived at using optionally adjustable path limits, or using setpoint specifications which are controllable by the control and monitoring device 29, wherein the use of controllable setpoint specifications allows flexible use of this linear axis.

The boom longitudinal axis 48 may intersect the rotational axis 24, as in the previously described exemplary embodiments, but in a departure therefrom it is shown in FIG. 6b that the longitudinal axis 48 of the boom element 26 may be situated at a boom distance 63 from the rotational axis 24 of the rotary head 23. This boom distance 63 may be used in particular to at least partially minimize, for the most common applications, the forces and load torques exerted on the rotary head 23 by the boom element 26, the gripping device 27, and the workpiece 4, for example by approximation of the center of gravity on the rotational axis 24. In the configuration illustrated, the boom distance 63 and the gripping distance 53 are oriented oppositely, i.e., in different directions, relative to the rotational axis 24, but may also have the same direction, but in any event the distance of the gripping zone 34 from the rotational axis 24 increases with increasing boom distance 63 and gripping distance 53.

FIG. 6b also shows that the gripping device 27 once again may have a drivable reversing rotation device 45, by means of which negative edgings, i.e., bends in various directions, relative to the primary plane of the workpiece 4 are possible without additional regripping procedures. FIG. 6b shows the manipulation device 3 in a first position for machining a first bending edge 37, which for this purpose is positioned in the bending plane 30. To position the second bending edge 38 in the bending plane 30 (see FIG. 6c), following from the position in FIG. 6b the gripping system must rotate about the rotational axis 24 by an angle of 90°. The gripping device 27 remains in the first working position 61. To position the third bending edge 43 in the bending plane 30, two partial motions of the manipulation device 3 are necessary. On the one hand, the boom element 26 together with the rotary head 23 must be moved relative to the rotational axis 24 by 180°, and on the other hand the gripping device 27, with the assistance of the linear drive 57, must be moved along the linear guide 58 from the first working position 61 to the second working position 62 on the boom element 26. The effect of the adjustment device 40 on the machining capabilities on the workpiece 4 also corresponds to the previously described exemplary embodiments, except that the auxiliary rotary device 41 is replaced by the linear drive 57.

FIGS. 7a through 7d show a further embodiment of the manipulation device 3 according to the invention. In this embodiment, once again a boom element 26 is mounted on the rotary head 23 and bears the gripping device 27. In contrast to the previously described embodiments, in the present case the boom element 26 is not rigidly connected to the rotary head 23, but instead by use of a swivel [rotation] device 64 is supported so as to be movable relative to the rotary head 23 about a swivel rotational axis 65. By means of the swivel rotation device 64 the boom element 26 together with the gripping device 27 may be moved from a first swivel position 66, illustrated in solid lines, to a second swivel position 67, illustrated in dashed lines. As shown in FIG. 7a, as a result of this swivel operation a reference surface 68 on the workpiece 4 which is upwardly oriented in the first swivel position is downwardly oriented in the second swivel position 67; i.e., the bending directions differ between the two swivel positions 66, 67. However, to be able to perform edgings in the same direction as in the first swivel position 66, an adjustment device 40 for the gripping device 27 in the form of a previously described reversing rotation device 45 is provided between the boom element 26 and the gripping device 27. By rotating the gripping device 27 about a reversing axis 47 by 180°, the workpiece 4 together with the reference surface 68 may also be oriented upwardly in the second swivel position 67.

FIG. 7b shows the same embodiment of the manipulation device 3, in a position in which a first bending edge 37 of the workpiece 4 is positioned in the bending plane 30. The boom element 26 is located in the first swivel position 66, and the reference surface 68 of the workpiece 4 is oriented upwardly.

For machining the second bending edge 38, the boom element 26 is rotated only once, by means of the rotary head 23, about the rotational axis 24 by an angle of 90°. The boom element 26 remains in the first swivel position 66. To position the third bending edge 43 in the reference plane 30, in this embodiment the following three steps are necessary:
a) Rotation of the rotary head 23 about the rotational axis 24 by an angle of 180°,
b) Actuation of the swivel rotation device 64 for bringing the boom element 26 from the first swivel position 66 into the second swivel position 67, and
c) Actuation of the reversing rotation device 45, in the event that the reference surface 68 of the workpiece 4 is to be likewise oriented upwardly for edging of the third bending edge 43.

As illustrated in FIG. 7d, in this design as well a boom distance 63 may be provided between the boom longitudinal axis 48 and the rotational axis 24, but in a departure therefrom, as in the previously described design variants, the boom longitudinal axis 48 may intersect the rotational axis 24. In contrast to the illustrated exemplary embodiment, the swivel rotational axis 65 may also be situated at a distance from the rotational axis 24, although in such a design the gripping device 27 is not symmetrically positioned with respect to the rotational axis 24 in the two swivel positions 66, 67, but this may be offset by the control and monitoring device 29.

Figure 8:
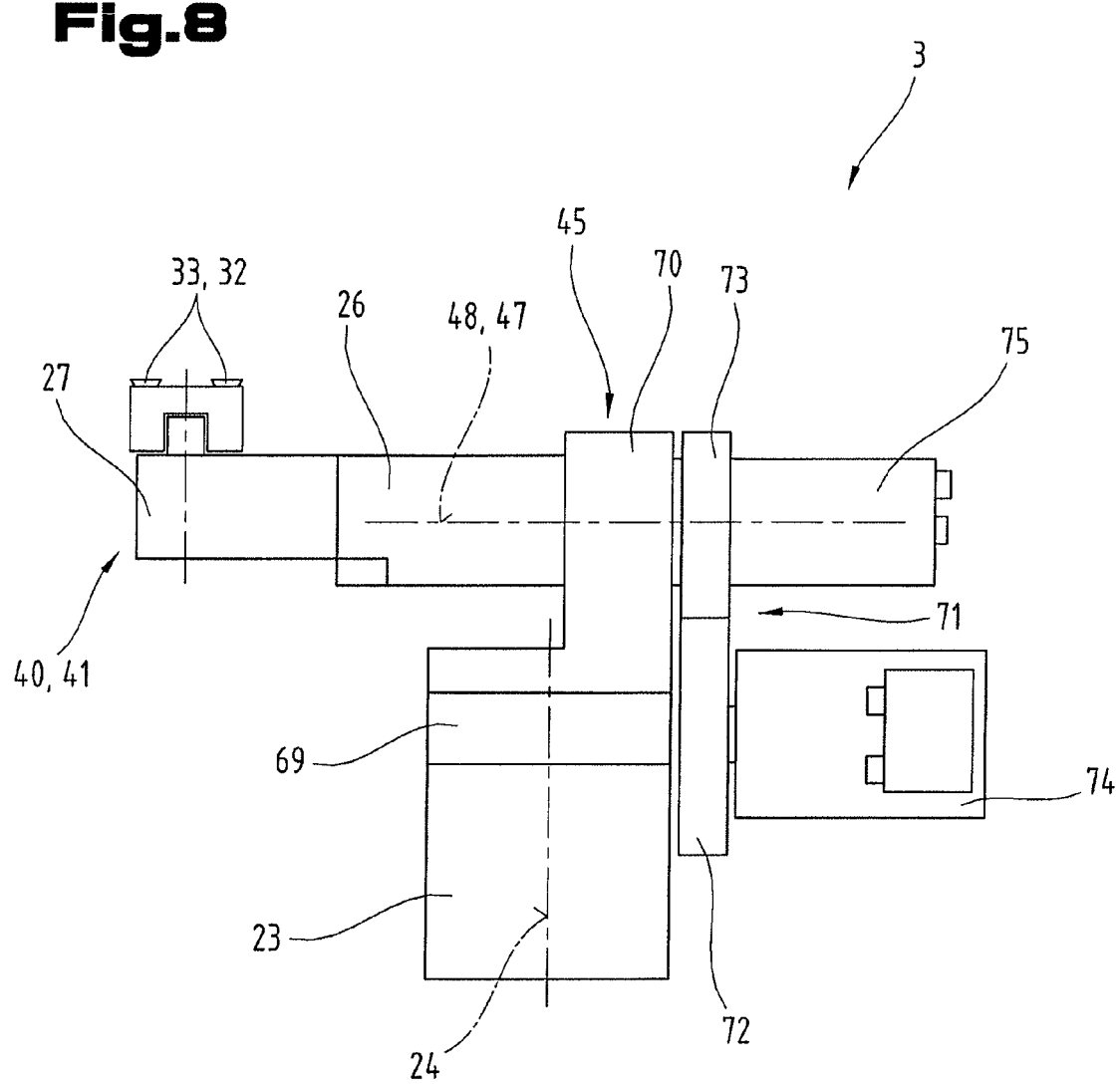
FIG. 8: shows a view of a further embodiment of the manipulation device according to the invention.

FIG. 8 shows a section of a further embodiment of the manipulation device 3 according to the invention. In this embodiment a coupling device 69 is connected to the previously described rotary head 23, and allows the unit attached to the rotary head 23 to be easily exchanged. The boom element 26 is connected to the coupling device 69 via a bearing block 70, and is supported therein so as to be rotatable about the boom longitudinal axis 48. This rotatable bearing of the boom element 26 in the bearing block 70 forms the reversing rotation device 45 together with the reversing axis 47, which coincides with the boom longitudinal axis 48. In this exemplary embodiment, the torque necessary for this reversing rotational motion is transmitted to the boom element 26 by means of gearing 71, comprising a first gearwheel 72 and a second gearwheel 73. The first gearwheel 72 is driven by a reversible drive motor 74, and drives the second gearwheel 73 which is connected to the boom element 26 in a rotationally fixed manner.

Also provided on the boom element 26 is an auxiliary motor 75, which forms the adjustment drive for the auxiliary rotary device 41 for moving the gripping device 27 relative to the boom element 26. The reversing drive motor 74 and the auxiliary motor 75, the same as for all the motors used for the manipulation device 3, may be designed as an electric motor, direct current motor, alternating current motor, synchronous motor, asynchronous motor, stepping motor, etc. The configuration of the drive motors on the opposite side from the gripping device 27 with respect to the reversing axis results in a favorable load distribution with relatively low load torques, which are introduced into the swivel-arm system 20 via the rotary head 23.

The principle of the manipulation device according to FIG. 8 corresponds to the principle of the design according to FIGS. 3a through 3c.

By use of a coupling device 69 it is possible in particular to quickly exchange components installed on the rotary head 23; i.e., the boom element 26 according to the invention together with the gripping device 27 provided thereon may be mounted with little installation effort, and the manipulation device 3 may be adapted to changing dimensions and characteristics of the workpieces 4 to be machined, even for relatively small lot sizes. A similar coupling device may also be advantageously provided between the boom element 26 and the gripping device 27, in particular in conjunction with the reversing rotation device 45.

The swivel and rotational axes provided on the manipulation device 3 between individual swivel arms, but in particular also the pivotable bearing of the boom element 26 in one embodiment may be realized in such a way that a rotational axis element is supported in a floating manner, but also on both sides of two mutually spaced bearing points for the upstream moving element.

Due to weight considerations, the boom element 26 is advantageously provided in the form of a hollow profile having an annular or rectangular tubular cross section, wherein the cavity may also be used for guiding lines through. In particular the boom element moved by a reversing rotation device 45, i.e., a connecting piece for the gripping device 27, is preferably designed with an annular cross section because of the rotational motion about its own axis.

The exemplary embodiments show possible design variants of the manipulation device 3 or the production system 1, it being noted at this point that the invention is not limited to the particular illustrated design variants thereof, but, rather, various combinations of the individual design variants with one another are also possible, and this possibility for variation is within the capability of one skilled in the art in this technical field, based on the teaching for technically carrying out the subject matter of the invention. Thus, all conceivable design variants which are possible as the result of combinations of individual details of the illustrated and described design variants are also included within the protective scope.

Lastly, as a matter of form it is noted that for better understanding of the design of the manipulation device 3, the manipulation device or its components have sometimes been illustrated not to scale and/or in enlarged scale and/or in reduced scale.

The object upon which the independent inventive approaches are based in each case may be inferred from the description section.

Above all, the embodiments illustrated in detail in FIGS. 1, 2, 3, 4, 5, 6, 7, and 8 constitute the subject matter of the independent inventive approaches. In this regard, the objects and approaches according to the invention are contained in the detailed descriptions of these figures.

LIST OF REFERENCE NUMERALS

| | |
|---|---|
| 1 | Production system |
| 2 | Bending press |
| 3 | Manipulation device |
| 4 | Workpiece |
| 5 | Machine frame |
| 6 | Press crosshead |
| 7 | Press crosshead |
| 8 | Actuator |
| 9 | Guide system |
| 10 | Bending tool |
| 11 | Bending tool |
| 12 | Pressing direction |
| 13 | Backstop |
| 14 | Base frame |
| 15 | Guide system |
| 16 | Longitudinal axis |
| 17 | Moving element |
| 18 | Swivel arm |
| 19 | Swivel joint |
| 20 | Swivel-arm system |
| 21 | Swivel axis |
| 22 | Moving element |
| 23 | Rotary head |
| 24 | Rotational axis |
| 25 | Center axis |
| 26 | Boom element |
| 27 | Gripping device |
| 28 | Regripping station |
| 29 | Control and monitoring device |
| 30 | Bending plane |
| 31 | Overlap |
| 32 | Gripping element |
| 33 | Vacuum suction element |
| 34 | Gripping zone |
| 35 | Midpoint |
| 36 | Distance |
| 37 | Bending edge |
| 38 | Bending edge |
| 39 | Cross-sectional dimension |
| 40 | Adjustment device |
| 41 | Auxiliary rotary device |
| 42 | Auxiliary rotational axis |
| 43 | Bending edge |
| 44 | Bending edge |
| 45 | Reversing rotation device |
| 46 | End section |
| 47 | Reversing axis |
| 48 | Boom longitudinal axis |
| 49 | Auxiliary rotational direction |
| 50 | Reversing rotational direction |
| 51 | Drive motor |
| 52 | Tong gripping element |
| 53 | Gripping distance |
| 54 | Gripping device primary axis |
| 55 | Width |
| 56 | Magnetic gripping element |
| 57 | Linear drive |
| 58 | Linear guide |
| 59 | Displacement direction |
| 60 | Guide runner |
| 61 | Working position |
| 62 | Working position |
| 63 | Boom distance |
| 64 | Swivel rotation device |
| 65 | Swivel rotational axis |
| 66 | Swivel position |
| 67 | Swivel position |
| 68 | Reference surface |
| 69 | Coupling device |
| 70 | Bearing block |
| 71 | Gearing |
| 72 | Gearwheel |
| 73 | Gearwheel |
| 74 | Reversing drive motor |
| 75 | Auxiliary motor |

The invention claimed is:

1. Manipulation device for manipulating a workpiece on a bending press, comprising multiple successive moving elements in the form of articulated arms connected to one another via articulated joints, wherein one moving element has a rotary head which is rotatable about a rotational axis which at least approximately coincides with a center axis of the moving element, and comprising a gripping device connected thereto having a gripping zone, formed by one or more gripping elements, by means of which the workpiece may be held in the gripping zone, wherein the gripping device is connected to the rotary head via a boom element extending along a boom longitudinal axis, by means of which a midpoint of the gripping zone is situated at a distance from the rotational axis, and further comprising an adjustment device on the boom element by means of which the position and/or angular orientation of the gripping device and the gripping zone with respect to the boom element may be adjusted in at least two different working positions;
   wherein the adjustment device includes a linear drive and a linear guide on the boom element, the linear drive and the linear guide being operable to move the gripping device along the boom element so as to adjust a position of the gripping zone, and correspondingly a position of a workpiece held in the gripping zone, along the boom element, wherein the linear guide lies in a plane perpendicular to the rotational axis of the rotary head, and wherein a primary axis of the gripping device may be oriented transverse to the boom longitudinal axis, and in this position the midpoint of the gripping zone is thus situated at a gripping distance from the boom longitudinal axis.

2. Manipulation device according to claim 1, characterized in that the boom longitudinal axis intersects the rotational axis.

3. Manipulation device according to claim 1, characterized in that the boom longitudinal axis is situated at a boom distance from the rotational axis.

4. Manipulation device according to claim 1, characterized in that the boom longitudinal axis is oriented in a plane perpendicular to the rotational axis.

5. Manipulation device according to claim 1, characterized in that a width of the gripping device, measured transverse to the gripping device primary axis, is smaller than a cross-sectional dimension of the moving element having the rotary head.

6. Manipulation device according to claim 5, characterized in that the width of the gripping device is less than half the cross-sectional dimension of the moving element having the rotary head.

7. Manipulation device according to claim 1, characterized in that the adjustment device includes an auxiliary rotation device on the boom element for rotation of the gripping device about an auxiliary rotational axis which is essentially parallel to the rotational axis.

8. Manipulation device according to claim 7, characterized in that by means of the auxiliary rotary device the gripping device may be rotated by one or more angular increments of 90° each, starting from a reference position.

9. Manipulation device according to claim 7, characterized in that by means of the auxiliary rotary device the gripping device is essentially infinitely rotationally adjustable, starting from a reference position.

10. Manipulation device according to claim 1, characterized in that by use of the linear drive the gripping device may be moved into two working positions on the boom element which are essentially mirror-symmetrical with respect to the rotational axis.

11. Manipulation device according to claim 1, characterized in that the linear drive includes a pneumatically or electrically drivable linear motor.

12. Manipulation device according to claim 1, characterized in that the gripping device is supported by means of a reversing rotation device so as to be pivotable relative to the boom element, about a reversing axis that is parallel to the primary axis of the gripping device or coincident with same.

13. Manipulation device according to claim 12, characterized in that by use of the reversing rotation device the gripping device may be rotated by angular increments of 180° each, starting from a reference angular orientation.

14. Manipulation device according to claim 1, characterized in that the gripping device is a magnetic gripping element.

15. Manipulation device according to claim 1, characterized in that the gripping device is a tong gripping element.

16. Manipulation device according to claim 1, characterized in that the gripping device is a vacuum suction element.

17. Manipulation device according to claim 1, characterized in that the boom element is connected to the rotary head via a coupling mechanism.

18. Production system comprising a bending press having two press crossbars which may be moved relative to one another and are provided with bending tools, and a manipulation device, characterized in that the manipulation device comprises:
   multiple successive moving elements in the form of articulated arms connected to one another via articulated joints, wherein one moving element has a rotary head which is rotatable about a rotational axis which at least approximately coincides with a center axis of the moving element, and comprising a gripping device connected thereto having a gripping zone, formed by one or more gripping elements, by means of which the workpiece may be held in the gripping zone, wherein the gripping device is connected to the rotary head via a boom element extending along a boom longitudinal axis, by means of which a midpoint of the gripping zone is situated at a distance from the rotational axis, and further comprising an adjustment device on the boom element by means of which the position and/or angular orientation of the gripping device and the gripping zone with respect to the boom element may be adjusted in at least two different working positions;
   wherein the adjustment device includes a linear drive and a linear guide on the boom element, the linear drive and the linear guide being operable to move the gripping device along the boom element so as to adjust a position of the gripping zone, and correspondingly a position of a workpiece held in the gripping zone, along the boom element, wherein the linear guide lies in a plane perpendicular to the rotational axis of the rotary head, and wherein a primary axis of the gripping device may be oriented transverse to the boom longitudinal axis, and in this position the midpoint of the gripping zone is thus situated at a gripping distance from the boom longitudinal axis.

19. Production system according to claim 18, characterized in that the manipulation device is supported so as to be movable on a guide system in the direction of a longitudinal axis of the press crossbars.

20. Production system according to claim 18, characterized in that the manipulation device, starting from a base frame, comprises three moving elements designed as swivel arms which via swivel joints are connected to form a swivel-arm system, with their swivel joints oriented parallel to the longitudinal axis of the press crossheads and with the rotary head mounted on the third swivel arm.

* * * * *